(12) United States Patent
Ertle et al.

(10) Patent No.: US 12,257,989 B2
(45) Date of Patent: Mar. 25, 2025

(54) ACCUMULATOR PISTON DEVICE

(71) Applicant: Robert Bosch GmbH, Stuttgart (DE)

(72) Inventors: Marcus Ertle, Immenstadt (DE);
Alexander Bareiss, Immenstadt (DE);
Juergen Reiner, Gestratz (DE);
Michael Loeffler, Oberstaufen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/562,441

(22) PCT Filed: Mar. 3, 2022

(86) PCT No.: PCT/EP2022/055366
§ 371 (c)(1),
(2) Date: Nov. 20, 2023

(87) PCT Pub. No.: WO2022/248090
PCT Pub. Date: Dec. 1, 2022

(65) Prior Publication Data
US 2024/0239325 A1    Jul. 18, 2024

(30) Foreign Application Priority Data
May 27, 2021   (DE) .............. 10 2021 205 371.8

(51) Int. Cl.
*B60T 17/06*   (2006.01)
*F15B 1/04*   (2006.01)

(52) U.S. Cl.
CPC ............... *B60T 17/06* (2013.01); *F15B 1/04* (2013.01)

(58) Field of Classification Search
CPC ........ F15B 1/24; F15B 1/04; F15B 2201/312; B60T 17/06
See application file for complete search history.

(56) References Cited

U.S. PATENT DOCUMENTS

| | | |
|---|---|---|
| 2,727,797 A | 12/1955 | Snyder |
| 6,390,133 B1 * | 5/2002 | Patterson ................. F15B 1/04 138/30 |
| 8,783,793 B2 * | 7/2014 | Terashima ............ B60T 13/686 303/DIG. 11 |
| 2019/0225203 A1 * | 7/2019 | Bodmann ............. B60T 8/4275 |

FOREIGN PATENT DOCUMENTS

| | | |
|---|---|---|
| DE | 10 2011 089 956 A1 | 6/2013 |
| DE | 10 2012 219 054 A1 | 4/2014 |
| EP | 0 586 995 A1 | 3/1994 |
| WO | 2019/029986 A1 | 2/2019 |

OTHER PUBLICATIONS

International Search Report corresponding to PCT Application No. PCT/EP2022/055366, mailed Jun. 23, 2022 (German and English language document) (5 pages).

* cited by examiner

*Primary Examiner* — Abiy Teka
(74) *Attorney, Agent, or Firm* — Maginot, Moore & Beck LLP

(57) ABSTRACT

An accumulator piston device having an accumulator piston which, on a circumference of a first shaft portion, has a first guide ring which surrounds the piston shaft and which protrudes radially over an externally dimensionally larger second shaft portion of the piston shaft.

13 Claims, 3 Drawing Sheets

ACCUMULATOR PISTON DEVICE

This application is a 35 U.S.C. § 371 National Stage Application of PCT/EP2022/055366, filed on Mar. 3, 2022, which claims the benefit of priority to Serial No. DE 10 2021 205 371.8, filed on May 27, 2021 in Germany, the disclosures of which are incorporated herein by reference in their entirety.

BACKGROUND

The disclosure relates to an accumulator piston device. Accumulator piston devices are, e.g., already known from DE 10 2012 219 054 A1.

Accumulator piston devices are preferably used in pressure medium accumulators of hydraulic units for electronic pressure control in brake systems of motor vehicles. For this purpose, they are movably guided in an accumulator cylinder and separate an accumulator chamber that can be filled with hydraulic pressure medium from an air chamber in which a piston spring acting on the accumulator piston device is usually arranged. Pressure medium flows into the accumulator chamber against the force of the piston spring and is released from at least one associated wheel brake of the vehicle brake system as part of brake pressure control.

In conventionally powered vehicles, i.e., those driven by an internal combustion engine, this type of brake pressure control usually takes place as a function of the current slip conditions on a wheel assigned to the wheel brake. The aim in this context is to counteract the locking of this wheel in order to maintain lateral guidance forces on the wheel and consequently a stable driving condition of the vehicle. Critical driving conditions in this respect occur relatively rarely, so the pressure medium accumulators are exposed to a relatively low load.

Electronically slip- or pressure-controlled vehicle brake systems are widely known and referred to as ABS/ESP brake systems.

Recently, more and more vehicles have come onto the market that are equipped with an electric drive in addition to a combustion engine or that are powered exclusively by an electric motor. In addition to their locally emission-free operation, electric drives have the advantage that they can be switched to generator mode, during which they convert the vehicle's kinetic energy into electrical energy and can thus brake the vehicle. The energy recovered can be used to power the vehicle at a later time, which ultimately increases the efficiency of the drivetrain of such a vehicle.

By simply switching a vehicle's electric drive to generator mode, a large number of a driver's braking requirements can be implemented without having to use the vehicle's conventional hydraulic braking system. Only if the generator braking torque alone is not sufficient for the desired deceleration of the vehicle is an auxiliary braking torque called upon by actuating the hydraulic brake system.

However, the generator braking torque decreases with the vehicle speed and thereby with the speed of a driven rotor. In order to provide a braking request specified by the driver or a corresponding total braking torque, the proportion of hydraulic braking torque must be increased as the proportion of generator braking torque decreases. To ensure that the driver is as unaware as possible of this, which is referred to as torque blending, the hydraulic brake pressure in electrically powered vehicles must be continuously adjusted during braking. This adjustment is made via the hydraulic unit of the hydraulic power brake system and via actuation of the pressure medium accumulator.

In contrast to conventionally powered vehicles, the pressure medium accumulator of the hydraulic unit is therefore involved in almost every braking process in vehicles with an electric drive and is therefore subject to a correspondingly higher load. In addition, with electrically powered vehicles, it is important to maximize the effectiveness of the aforementioned energy recovery during braking. This in turn presupposes that the pressure medium accumulator features a low response pressure, i.e., even small pressure differences are enough to actuate the accumulator piston device thereof.

Known pressure medium accumulators are disadvantageous in this respect because their accumulator piston devices are guided for effective guidance and sealing in the accumulator cylinder with relatively high radial contact pressure forces on the wall of an accumulator cylinder. Such high contact forces are necessary because accumulator piston devices are often made of plastic and are therefore radially removed from the tool. This results in separation rates in a region of the accumulator piston device where a seal is later provided, which have a detrimental effect on the sealing conditions and must be taken into account by increasing the contact pressure.

Although it is possible to circumvent this disadvantage by using accumulator piston devices that are manufactured as turned parts, preferably from aluminum, this manufacturing method is complex, expensive, and contributes to an increase in the overall weight of a hydraulic power unit.

A further disadvantage is that the seals of conventional pressure medium accumulators are equipped with molded seals that have a solid seal cross-section due to the increased contact pressure or for reasons of wear protection. Due to their reduced elasticity, molded gaskets of this type have disadvantages with regard to sealing and/or friction properties at falling ambient temperatures. As a result, known pressure medium accumulators feature a response behavior that impairs the effectiveness of energy recovery and ultimately delays the emptying of the pressure medium accumulator and thus a reduction in brake pressure at the end of a braking process.

SUMMARY

Accordingly, the disclosure according to the features disclosed herein has the advantage that the proposed accumulator piston device creates a pressure medium accumulator with extremely advantageous response behavior. The advantageous response behavior is due in particular to the fact that low radial contact pressure forces are sufficient to guide and seal the accumulator piston device in an accumulator cylinder. In other words, a guide ring presses against the wall of the accumulator cylinder with a relatively low force and is therefore subject to less friction and consequently exhibits better wear behavior.

This is achieved by designing the accumulator piston device such that the accumulator piston can be removed axially from a mold tool in the direction of the longitudinal axis of the piston. Separation rates can thereby be avoided, at least in the region of the arrangement of a seal on the accumulator piston device. The accumulator piston device or its accumulator pistons can also be made of plastic at a low cost and have a low weight. Preferably, a conventional injection molding process can be used for this purpose.

Advantageous response behavior of a pressure medium accumulator also results in a rapid emptying of the accumulator volume of a pressure medium accumulator at the end of a braking process and, accordingly, in a rapid brake pressure reduction.

Further advantages or advantageous embodiments of the disclosure result from the following description.

Due to the lower radial contact pressure forces, a lip seal can then be used as a seal. Due to their elasticity, lip seals are characterized in particular by advantageous sealing properties over a wide temperature range with simultaneously low friction on the wall of the accumulator cylinder and correspondingly low wear. In addition, lip seals are more adaptable to given sealing conditions than conventional molded seals with respect to the choice of material.

In an accumulator piston device according to the disclosure, the guide ring performs two functions; on the one hand, it guides the accumulator piston in the accumulator cylinder and, on the other hand, it supports a seal of the accumulator piston device in the direction of the longitudinal axis of the piston. Ultimately, this facilitates the design of an accumulator piston.

In an embodiment of the disclosure that is particularly advantageous in terms of tool costs, the guide ring can be molded onto the piston shaft of the accumulator piston in a bonded manner which is, e.g., possible using a conventional 2-component injection molding process.

BRIEF DESCRIPTION OF THE DRAWINGS

Exemplary embodiments of the disclosure are shown in the drawings and are explained in detail in the following description. The drawings include multiple figures, in which corresponding components are provided with uniform reference characters.

The drawings show the exemplary embodiments in cross-section. Shown are.

DETAILED DESCRIPTION

Figure 1:
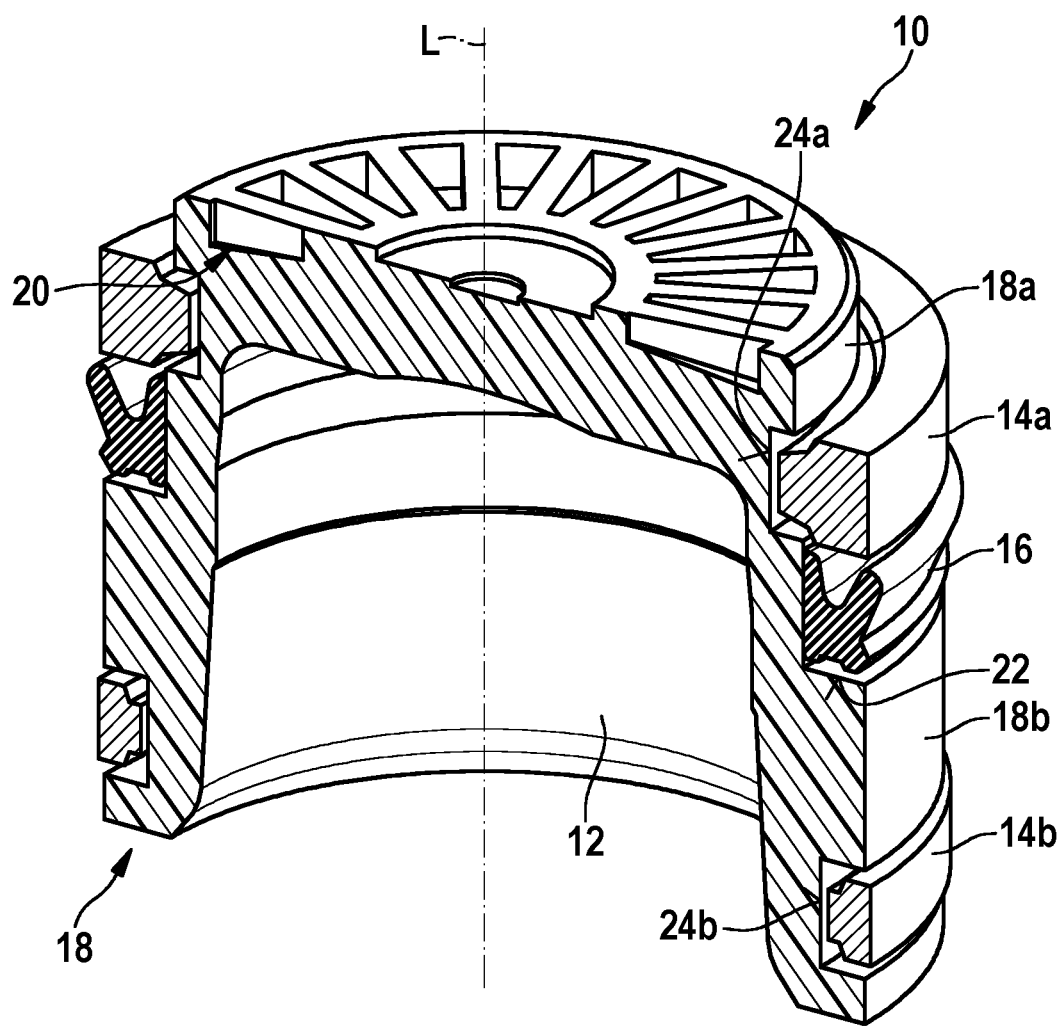
FIG. 1 a perspective view of a first exemplary embodiment of an accumulator piston device according to the disclosure.

The first exemplary embodiment of an accumulator piston device (10) according to FIG. 1 comprises an accumulator piston (12), two guide rings (14a, 14b) attached to the outer circumference and to opposite ends of this accumulator piston (12) and a sealing ring (16) placed between the guide rings (14a, 14b).

For its part, the accumulator piston (12) is designed as a hollow piston and comprises a sleeve-shaped piston shaft (18) and a piston crown (20), which closes one end of this piston shaft (18), which is at the top in FIG. 1. The outward-facing end face of the piston crown (20) can be designed as desired and is structured in a star shape in the exemplary embodiment shown.

The piston shaft (18) is divided in the direction of a longitudinal piston axis (L) into a total of two cylindrical shaft portions (18a, 18b), which differ from one another in their outer dimensions. A first shaft portion (18a), on which the piston crown (20) is arranged, has a smaller outer diameter than an adjoining second shaft portion (18b), with an end of the accumulator piston (12) opposite the piston crown (20) and open at the bottom. A transition between the first and second shaft portions is, by way of example, designed as a right-angled step. The latter forms an abutment shoulder (22) for the seal (16) of the accumulator piston device (10) arranged on the circumference of the first shaft portion (18a).

This seal (16) is designed as a lip seal with two sealing lips that extend in the direction of the longitudinal axis (L) of the piston. The flank of the seal (16) facing the abutment shoulder (22) is closed, while the opposite flank is open. There, the sealing lips enclose a wedge-shaped circumferential groove between them that is open towards the first guide ring (14a).

The lip seal ring is arranged between the first guide ring (14a) and the abutment shoulder (22) on the first shaft portion (18a) of the accumulator piston device (10). The first guide ring (14a) is designed as a closed ring, the overall cross-section of which is divided into a first cross-sectional region, which determines the inner diameter region of the guide ring, and a second cross-sectional region, which determines the outer diameter of the guide ring (14a). The first cross-sectional region of the guide ring (14a) lies in an annular groove (24a) formed on the first shaft portion (18a) of the accumulator piston (12), while the second cross-sectional region projects radially from this annular groove (24a) and projects radially beyond the second shaft portion (18b) of the piston shaft (18). This second cross-sectional region of the guide ring (14a) is exposed towards the piston crown (20), i.e. its lateral flank, which projects radially beyond the piston crown (20), is not covered by the accumulator piston (12).

A second guide ring (14b) of the accumulator piston device (10) is also arranged in an annular groove (24b) on the second shaft portion (18b), i.e. on the shaft portion with the larger outer dimension of the accumulator piston (12). The outer diameters of the two guide rings (14a, 14b) are approximately the same size.

Figure 2:
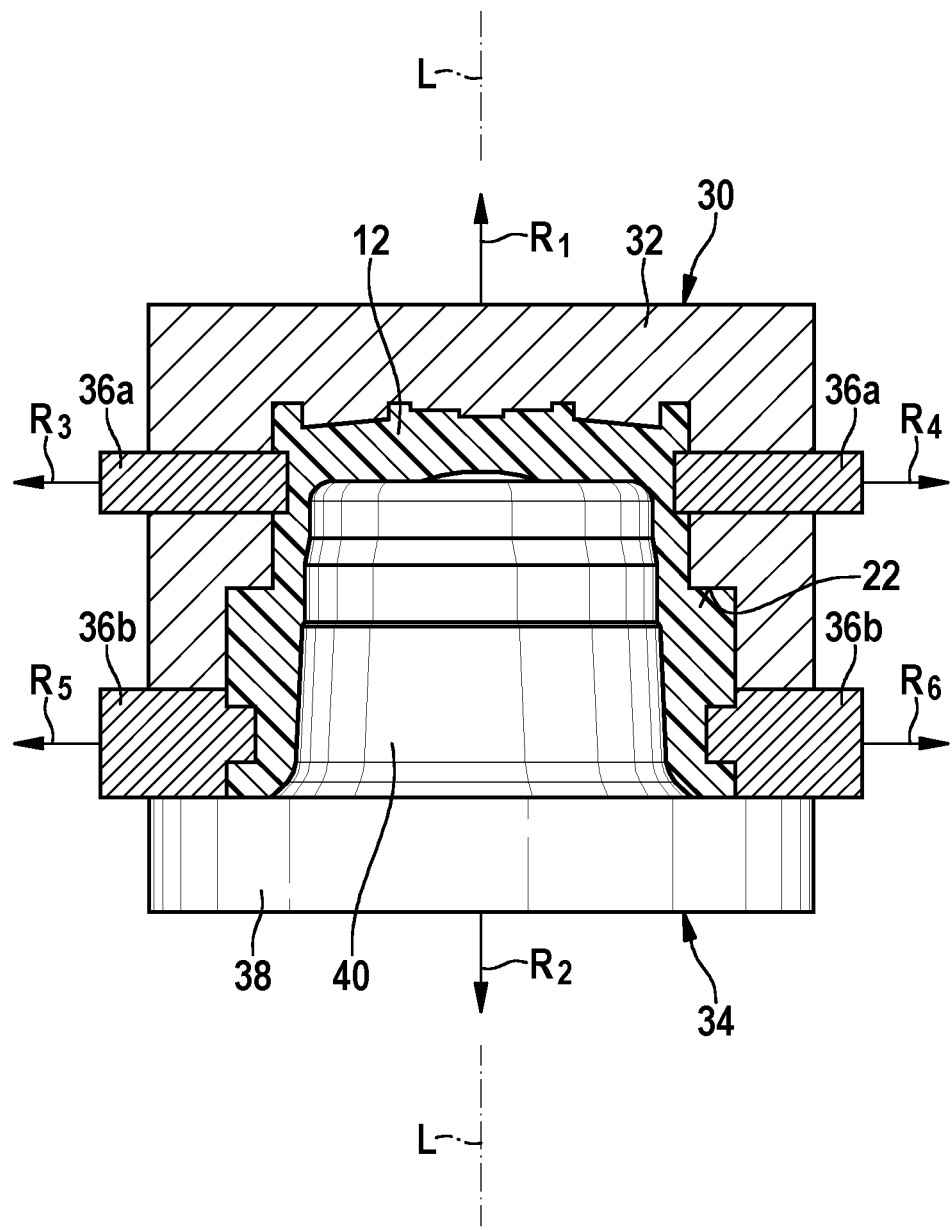
FIG. 2 the accumulator piston of the accumulator piston device during manufacture in a mold tool and FIG. 3 a second exemplary embodiment of the disclosure.

FIG. 2 shows a mold tool (30) for injection molding of the plastic accumulator piston (12) according to FIG. 1. This mold tool (30) consists of a cup-shaped casting mold (32), a forming die (34) inserted into this casting mold (32) and two lateral pairs of slides (36a, 36b) which can be inserted at different heights and from opposite directions into associated horizontal gaps of the casting mold (32). The two pairs of slides (36a, 36b) are used to form annular grooves (24a, 24b) on the outer circumference of the first and second shaft portions (18a, 18b) of the piston shaft (18), which are provided to accommodate the two guide rings (14a, 14b). The inner wall of the casting mold (32) forms the outer contour of the accumulator piston (12), i.e. the different outer dimensions of the two shaft portions (18a, 18b) as well as the abutment shoulder (22) at the transition between these two shaft portions (18a, 18b). The base of the casting mold (32) is designed to form the star-shaped texture described above on the outward-facing end face of the piston crown (20).

The forming die (34) closes the opening of the casting mold (32) to the outside with a die plate (38). A die (40) is attached to this die plate (38) which, when closed, projects into the interior of the casting mold (32) such that a cavity is enclosed between the outer wall of the die (40) and the inner wall of the casting mold (32). This cavity accommodates the accumulator piston (12), which is produced during an injection process by filling the cavity with plastic. After the injected plastic mass has cooled down, the pairs of slides (36a, 36b) have been retracted and the forming die has been lifted off, this accumulator piston (12) can be removed axially from the casting mold (32) in the direction of the longitudinal axis (L) of the piston. The axial demoldability of the accumulator piston (12) is indicated by the directional arrows R1 and R2 in FIG. 2.

Due to this axial demoldability of the accumulator piston (12) from the casting mold (32), at least one region (42) of the accumulator piston (12), which is formed between the annular groove (24a) on the first shaft portion (18a) and the abutment shoulder (22) and on which the seal (16) of the accumulator piston device (10) is later arranged, can be produced with a particularly high surface quality and in particular without an interfering parting line. The lack of separation rates enables the use of a seal (16) that presses against a receptacle for the accumulator piston device (10) with relatively low radial preload and thus allows the use of a lip seal instead of a seal (16) with a solid seal cross-section.

Figure 3:
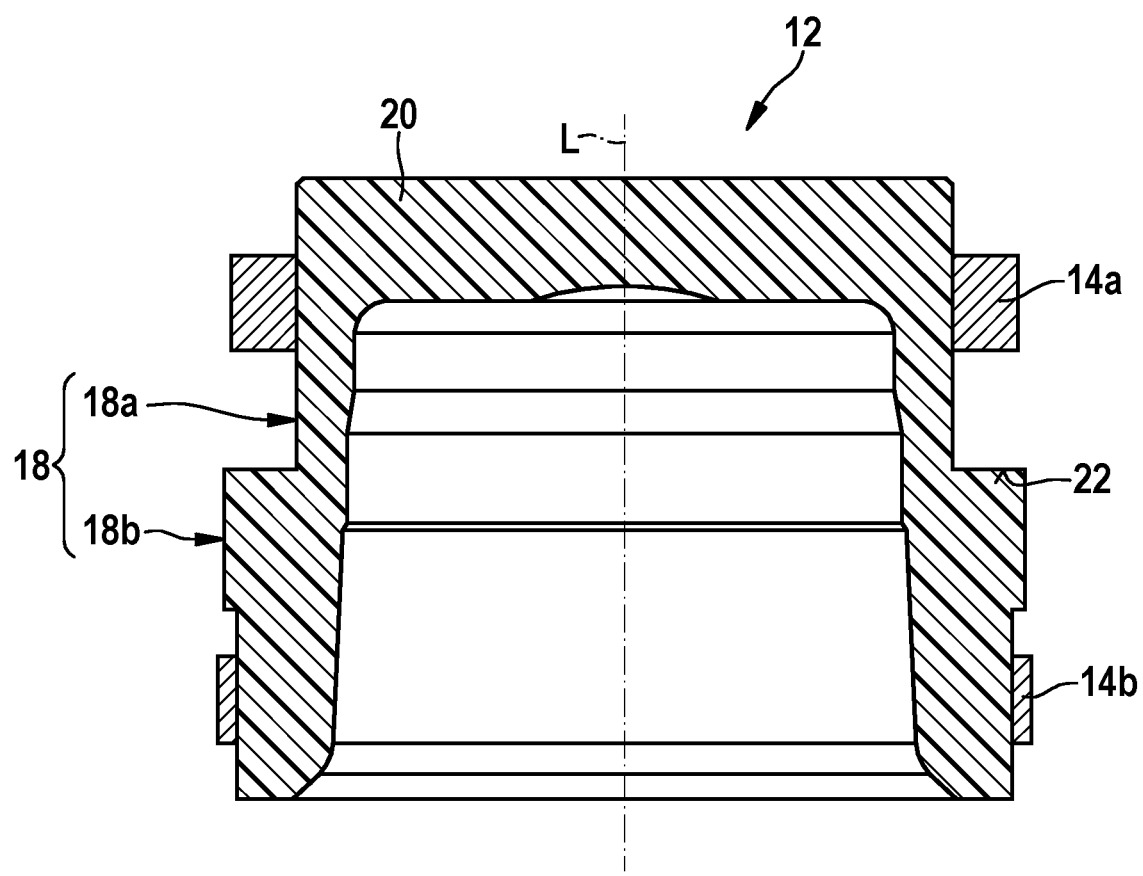

FIG. 3 shows a second exemplary embodiment of an accumulator piston (12) fitted with guide rings (14a, 14b) in cross-section. This accumulator piston (12) corresponds in its inner and outer shape to the accumulator piston (12) explained in connection with the description in FIG. 1 or FIG. 2. What differs from the previously described accumulator pistons (12), however, is that the two guide rings (14a, 14b) are not arranged in annular grooves, but rather are molded or injection-molded directly onto the circumferential surface of the accumulator piston (12) in a two-component injection molding process. By using molded guide rings (14a, 14b) which are, i.e., attached to the accumulator piston (12) in a bonded manner, it is possible to omit pairs of slides on the tool for producing annular grooves in order to accommodate guide rings during the production of accumulator pistons. Inevitably, this also avoids separation rates that occur at the separating surface between the respective pair of slides. Furthermore, the casting mold for manufacturing the accumulator piston (12) is simplified and thereby its cost.

Of course, modifications or additions to an accumulator piston device (10) beyond those described are conceivable without these modifications leaving the scope of the disclosure.

The invention claimed is:

1. An accumulator piston device for a pressure medium accumulator of a hydraulic unit for brake pressure control in an electronically pressure-controllable power brake system of an electrically driven motor vehicle, comprising:
    an accumulator piston, which comprises a sleeve-shaped piston shaft and a piston crown which closes the sleeve-shaped piston shaft at one of its ends,
    wherein the piston shaft is divided in a direction of a longitudinal piston axis into successive shaft portions of different outer diameters,
    wherein outer diameters of the successive shaft portions increase in respective steps starting from a first shaft portion, on which the piston crown is arranged, the first shaft portion defining a first outer diameter that is a smallest outer diameter of the successive shaft portions,
    wherein a first step of the respective steps between the first shaft portion and a subsequent shaft portion of the successive shaft portions in the longitudinal axis of the piston forms an abutment shoulder for a seal of the accumulator piston device arranged on the first shaft portion, and
    wherein the accumulator piston includes a first guide ring on the first shaft portion, the first guide ring configured to surround the piston shaft, and
    wherein a maximum diameter of the crown is equal to or less than the first outer diameter of the first shaft portion.

2. The accumulator piston device according to claim 1, wherein:
    the seal is arranged on a circumference of the first shaft portion between the first guide ring and the abutment shoulder.

3. The accumulator piston device according to claim 2, wherein:
    the seal is a lip seal which is supported by a closed flank in the direction of the longitudinal axis of the piston on the abutment shoulder.

4. The accumulator piston device according to claim 1, wherein:
    portions of the first guide ring are received in an annular groove on the first shaft portion of the accumulator piston, and portions of the first guide ring project radially from the annular groove.

5. The accumulator piston device according to claim 4, wherein:
    the annular groove is a first annular groove,
    the accumulator piston includes a second guide ring fitted in a second annular groove on the subsequent shaft portion, and
    the second guide ring defines an outer diameter that is equal to an outer diameter of the first guide ring.

6. The accumulator piston device according to claim 1, wherein:
    the accumulator piston is an injection-molded part, which is removable from a mold tool in the direction of the longitudinal axis of the piston and is made of plastic.

7. The accumulator piston device according to claim 1, wherein:
    the seal adjoins a jacket wall of the first shaft portion of the accumulator piston, which jacket wall is produced by injection molding without post-process machining.

8. The accumulator piston device according to claim 1, wherein:
    the first guide ring of the accumulator piston device is molded in a bonded manner onto the first shaft portion of the piston shaft.

9. The accumulator piston device according to claim 1, wherein:
    in the direction of the piston longitudinal axis, a lateral flank of the first guide ring facing the piston crown is not covered by the accumulator piston.

10. The accumulator piston device according to claim 1, wherein there are only two successive shaft portions.

11. The accumulator piston device according to claim 1, wherein each shaft portion of the successive shaft portions defines a cylindrical surface that is exposed along the longitudinal piston axis.

12. The accumulator piston device according to claim 1, wherein:
    the first guide ring is fitted in a first annular groove on the first shaft portion, and
    an outer diameter of the first annular groove is less than the first outer diameter of the first shaft portion.

13. The accumulator piston device according to claim 1, wherein:
    the first guide ring projects radially beyond the subsequent shaft portion of the piston shaft,
    an outer diameter of the first guide ring is greater than an outer diameter of the subsequent shaft portion and the first outer diameter of the first shaft portion, and
    an outer diameter of the first annular groove is less than the first outer diameter of the first shaft portion.

* * * * *